Figure 3:
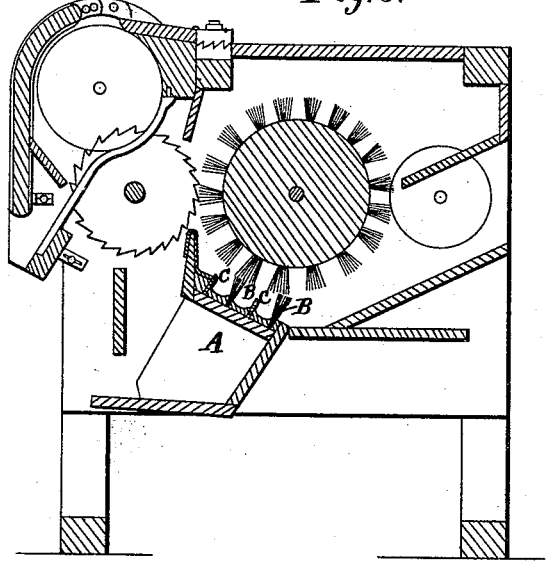

P. C. SAWYER.
COTTON-GIN.
No. 186,882. Patented Jan. 30, 1877.
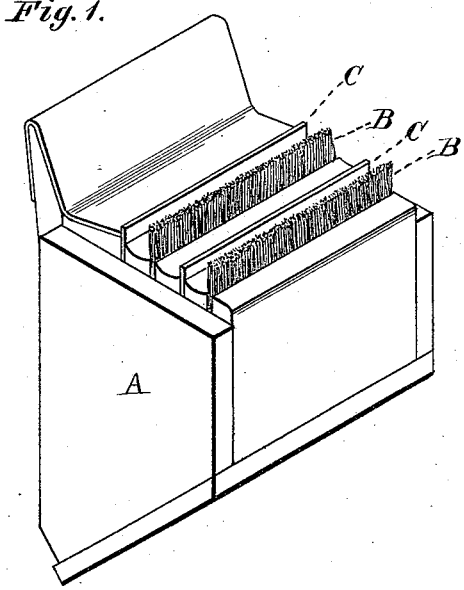
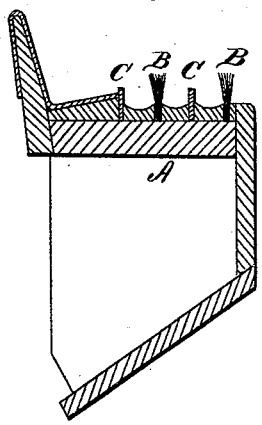

2 Sheets—Sheet 2.

P. C. SAWYER.
COTTON-GIN.

No. 186,882. Patented Jan. 30, 1877.

WITNESSES
Henry N. Miller
F. L. Durand
By

INVENTOR
Peter C. Sawyer
Alexander Mason
Attorney

UNITED STATES PATENT OFFICE.

PETER C. SAWYER, OF MACON, GEORGIA.

IMPROVEMENT IN COTTON-GINS.

Specification forming part of Letters Patent No. 186,882, dated January 30, 1877; application filed June 20, 1876.

*To all whom it may concern:*

Be it known that I, P. C. SAWYER, of Macon, in the county of Bibb, and in the State of Georgia, have invented certain new and useful Improvements in Cotton-Gins; and do hereby declare that the following is a full, clear, and exact description thereof, reference being had to the accompanying drawing, and to the letters of reference marked thereon, making a part of this specification.

My invention consists in combining alternate rows of brushes and metallic stripping plates or bars to a frame-work arranged in a cotton-ginning machine directly under the usual revolving stripping-brush cylinder now commonly employed.

In order to enable others skilled in the art to which my invention appertains to make and use the same, I will now proceed to describe its construction and operation, referring to the accompanying drawing, in which—

Figure 1 is a perspective view of my combination detached from the frame-work of the gin. Fig. 2 is a longitudinal section of the same. Fig. 3 represents my improvement as applied to the well-known saw-gin, showing the relative arrangement of the whipping-bed and revolving brush-drum and other parts.

The main frame-work of the gin, the gin-saws, hopper, and revolving brush-stripping drum are constructed and arranged in any well-known manner. Under the latter, and attached to a frame or bed, A, are arranged a series of rows of upright brushes, B, and metallic blades C, alternating and extending crosswise of the machine, as seen in the drawing.

I am aware that rows of brushes alone thus arranged are not new. I am also aware that rows of blades alone thus arranged are not new. Hence I disclaim such devices, when taken separately, as my invention.

In the saw-gin as known to me, where the metallic blades are used alone, such whipping bars or blades must be placed sufficiently far away from the brush-drum to not touch it; otherwise the bristles of the brush-drum would be cut by the blades, and soon wear away.

In my invention the rows of brushes extend higher than the whipping bars or plates, so that the revolving brush-drum will come in contact with the stationary brushes, but not with the whipping-bars. These bars or plates are placed in a position and distance from the brush drum or cylinder, so that the cotton will be beaten against the bars, and by alternating the rows of bars and the rows of brushes, and by allowing the bristles of the drum and the stationary brushes to touch each other, the cotton is thoroughly opened and cleansed of sand, dust, trash, and all foreign matter, thereby greatly enhancing the market value of the cotton.

If brushes were used alone, they being elastic and yielding, the cotton would not be thoroughly cleaned, as it could not be sufficiently beaten and whipped, as is the case when the alternating blades and brushes are used.

By combining the metal blades and the brushes under the drum in alternate rows, the cotton first strikes a blade or bar, and is beaten against the same, and the cotton then strikes a brush, and is whipped. It then again strikes a blade, and then a brush, and so on alternately.

The ends of the bristles on the drum and the ends of the stationary brushes below coming in direct contact with each other—the cotton having been beaten and opened by striking against the blades or bars—the whipping it receives in passing between the bristles and blades combined causes it to be thoroughly cleaned of all impurities.

Having thus fully described my invention, what I claim as new, and desire to secure by Letters Patent, is—

In a cotton-gin substantially as shown, the whipping-bed A, provided with a series of alternating rows of upright brushes, B, and metallic bars or blades C, constructed and arranged to operate substantially as and for the purposes herein set forth.

In testimony that I claim the foregoing I have hereunto set my hand this 27th day of May, 1876.

PETER C. SAWYER.

Witnesses:
J. M. MASON,
C. B. WILLINGHAM.